(12) United States Patent
Kaneda et al.

(10) Patent No.: US 7,035,423 B2
(45) Date of Patent: Apr. 25, 2006

(54) MOBILE TERMINAL WITH ELECTROMAGNETIC ACTUATOR

(75) Inventors: Shoichi Kaneda, Adachi-ku (JP); Kenji Ueno, Adachi-ku (JP); Minoru Ueda, Adachi-ku (JP)

(73) Assignee: Namiki Seimitsu Houseki Kabushiki Kaisha, Tokyo (JP)

( * ) Notice: Subject to any disclaimer, the term of this patent is extended or adjusted under 35 U.S.C. 154(b) by 143 days.

(21) Appl. No.: 10/312,871

(22) PCT Filed: Apr. 25, 2002

(86) PCT No.: PCT/JP02/04185

§ 371 (c)(1),
(2), (4) Date: Apr. 2, 2003

(87) PCT Pub. No.: WO02/091561

PCT Pub. Date: Nov. 14, 2002

(65) Prior Publication Data
US 2003/0146825 A1 Aug. 7, 2003

(30) Foreign Application Priority Data
May 1, 2001 (JP) .............................. 2001-133977

(51) Int. Cl.
*H04R 1/00* (2006.01)

(52) U.S. Cl. ..................................... 381/396; 412/117
(58) Field of Classification Search ............... 381/117, 381/152, 396, 412
See application file for complete search history.

(56) References Cited

U.S. PATENT DOCUMENTS

| 5,828,767 A | * | 10/1998 | Button | ........................ 381/401 |
| 6,118,613 A | | 9/2000 | Kojima | |
| 6,725,109 B1 | * | 4/2004 | Hile et al. | .................... 700/94 |

FOREIGN PATENT DOCUMENTS

JP 3-39392 4/1991

* cited by examiner

*Primary Examiner*—Brian T. Pendleton
(74) *Attorney, Agent, or Firm*—Nixon Peabody LLP; Donald R. Studebaker

(57) ABSTRACT

This invention deals with a portable terminal that reduces extraneous tones in a portable terminal in which is mounted an electromagnetic induction actuator that produces voice signals, a buzzer signal or a low frequency vibration. By short-circuiting the terminal fittings of the electromagnetic induction actuator or by connecting them electrically to amplifiers or to a signal generator that produces a constant voltage signal or a constant-frequency signal, the extraneous tone produced by vibration of the mechanical vibration system of the actuator is reduced.

5 Claims, 5 Drawing Sheets

Oscillation characteristics of mechanical vibration system 20 when the mechanical switch 2 is open Oscillation characteristics of mechanical vibration system 20 when the mechanical switch 2 is closed

MOBILE TERMINAL WITH ELECTROMAGNETIC ACTUATOR

FIELD OF INDUSTRIAL USE

This invention deals with a portable terminal in which is mounted an electromagnetic induction actuator that produces a communicant voice, a buzz, a melody or a low frequency vibration, in accordance with the frequency of an electric signal.

PRIOR TECHNOLOGY

In recent years the growing popularity of portable terminals, as represented by portable telephones, has been remarkable. As means of incoming call notification, these portable terminals have been fitted, normally, with small, cylindrical motors for generation of vibrations to be sensed by the body, transducers to create a buzzing sound, and speakers used for communicant voice signals.

Because there is generally a strong preference for miniaturized portable terminals, efforts have been made to reduce the number of parts mounted within the terminals. As a specific example, an electromagnetic induction actuator 1, shown in FIG. 8, has been proposed and put into practical use. In this electromagnetic induction actuator 1, a plate magnet 24, a yoke 25 and a pole piece 23 make up a magnetic circuit 9 that is supported by two leaf-spring suspensions 21, 22 within a cylindrical housing 19 to constitute a magnetic vibration system 6.

A voice coil 8 is attached to a diaphragm 18 that is fitted and fixed into the open end of the housing 19, input terminals are formed by placing terminal fittings 3, 3' on a terminal seat 20 that projects outward from the side of the housing 19, and the voice coil 8 is connected electrically to the terminal fittings 3, 3'.

By changing the frequency of the electric signal applied to the voice coil 8, it is possible to drive either one or both of the diaphragm 18 and the mechanical vibration system 6, such that the diaphragm 18 produces a buzzer sound, melodies or communicant voice and the mechanical vibration system 6 produces a vibration sensed by the body. That is, because it is possible to produce a vibration sensed by the body, communicant voice, and a buzzer sound or melodies with a single actuator 1, it is possible to reduce the number of mechanisms mounted in portable terminals.

However, when a portable terminal in which this electromagnetic induction actuator 1 is mounted is awaiting an incoming call, that is, when the electromagnetic induction actuator is not operating, a tap on the outer case of the portable terminal will cause the mechanical vibration system to oscillate and produce the sound of a snapped string (hereafter this sound is referred to as an extraneous tone). This extraneous tone may cause the user to sense a lack of rigidity in the case of his portable terminal, or give the false impression of a malfunction or improper mounting of parts within the portable terminal.

For that reason, the present inventors have devised a portable terminal in which is mounted an extraneous tone reduction device to dampen the vibration of the mechanical vibration system. They have a further goal of providing an extraneous tone reduction device by an inexpensive and simple means, and thereby prevent increases in the cost or size of the portable terminal.

DESCRIPTION OF INVENTION

This invention is a portable terminal in which is mounted an electromagnetic induction actuator that has as its base a housing in which magnet with yoke and pole piece make up a magnetic circuit that is supported by leaf-spring to constitute mechanical vibration system, there being diaphragm fixed in open end of the housing, voice coil attached to the diaphragm, and terminal fittings that are placed on terminal seat projecting outward from side of the housing, the voice coil being connected electrically to the terminal fittings, in which the electromagnetic induction actuator have switching means that causes current to flow in the voice coil by short-circuiting the terminal fittings when the portable terminal is awaiting an incoming call.

This invention also provides a portable terminal in which is mounted an electromagnetic induction actuator that has as its base a housing in which magnet with yoke and pole piece make up a magnetic circuit that is supported by leaf-spring to constitute mechanical vibration system, there being diaphragm fixed in open end of the housing, voice coil attached to the diaphragm, and terminal fittings that are placed on terminal seat projecting outward from side of the housing, the voice coil being connected electrically to the terminal fittings, in which amplifier that is electrically connected to the terminal fittings and is normally set in operating state by application of a voltage, and which adjusts the output signal by feedback of signal found on the terminal fittings when the portable terminal is awaiting an incoming call.

This invention also provides a portable terminal in which is mounted an electromagnetic induction actuator as described in claim 2, in which there is signal generation source electrically connected to the amplifier, which outputs a constant-voltage signal and a constant-frequency signal to the amplifier.

OPTIMUM MODE TO IMPLEMENT INVENTION

Figure 1:
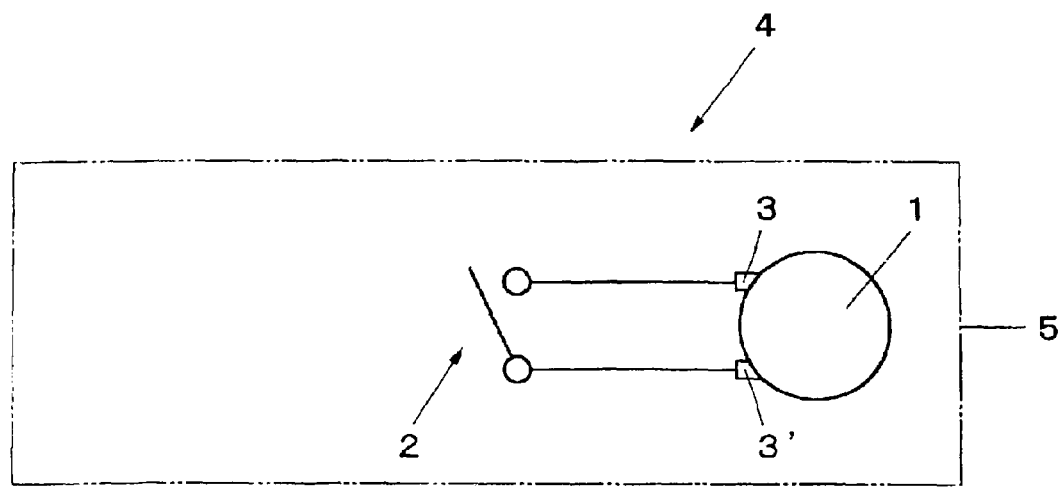
FIG. 1 is a schematic diagram showing the internal construction of portable terminal of the first example of implementation of this invention.
Figure 2:
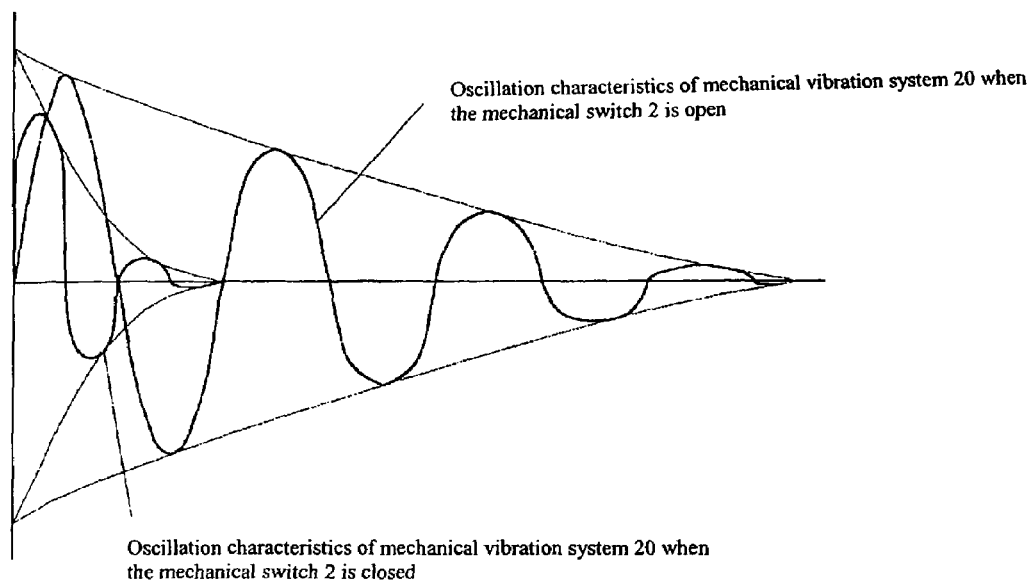
FIG. 2 is a graph showing the oscillation characteristics of the mechanical vibration system inside the electromagnetic induction actuator as measured at the outer case of the terminal equipment.
Figure 8:
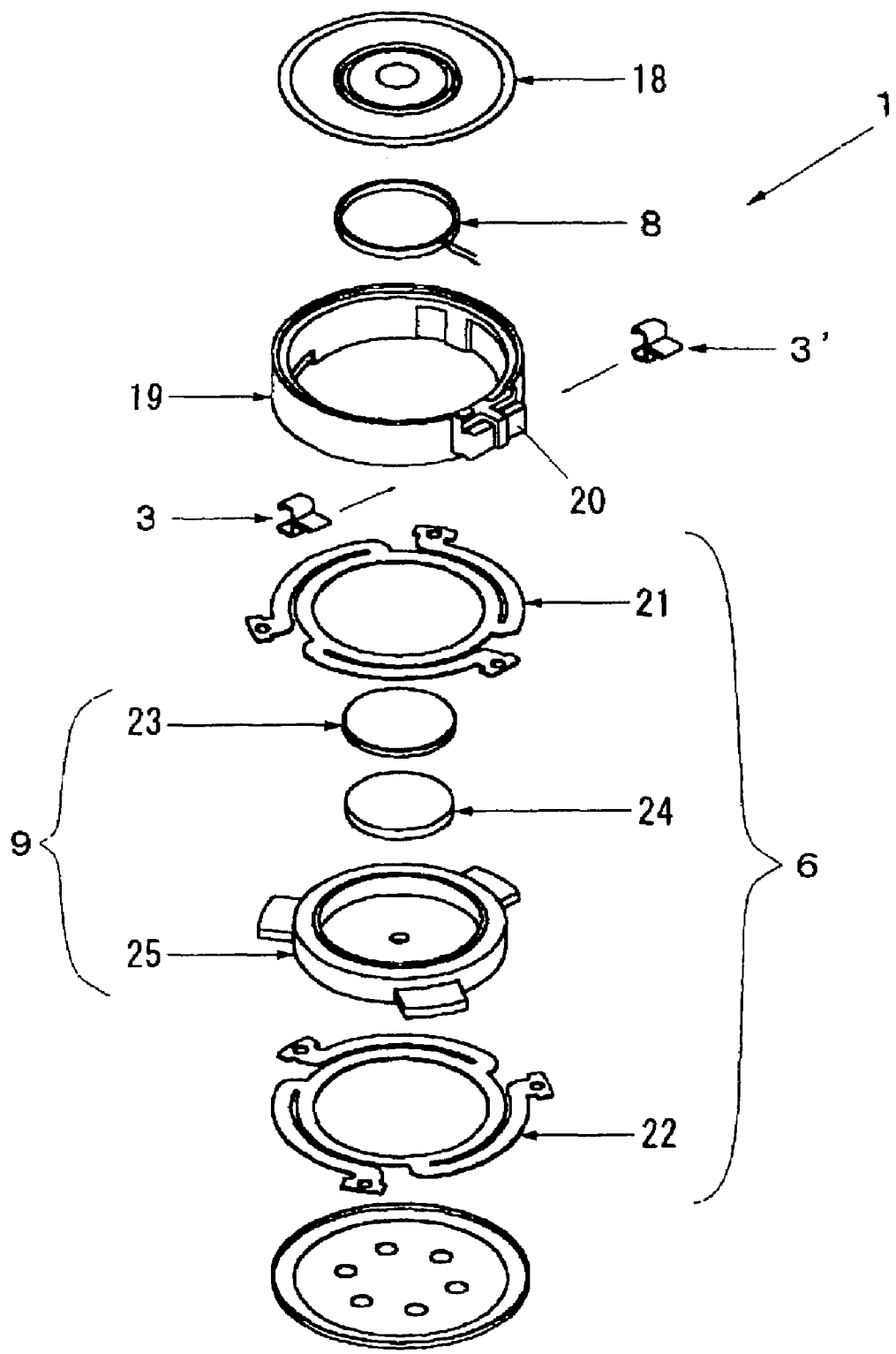
FIG. 8 is a schematic oblique drawing showing the electromagnetic induction actuator.

First Example of Implementation: The first example of implementation of the portable terminal of this invention is explained in detail below, with reference to FIGS. 1 through 4. FIG. 1 is a schematic diagram showing the internal construction of portable terminal of the first example of implementation of this invention, and FIG. 2 is a graph showing the oscillation characteristics of the mechanical vibration system inside the electromagnetic induction actuator as measured at the outer case of the terminal equipment. As shown in FIG. 1, an electromagnetic induction actuator 1 and a mechanical switch 2 that is the switching means that short circuits the terminal fittings 3, 3' are mounted within the outer case 5, indicated by the broken line, of the portable terminal 4. The following explanation of this example of implementation is based on the assumption that the electromagnetic induction actuator 1 is not in the operating state; that is, the portable terminal 4 is in the state of awaiting an incoming call. Now, the internal structure, operation and functions of the electromagnetic induction actuator 1 are the same as shown in FIG. 8; duplicative explanation is omitted.

The principle behind production of an extraneous tone will be explained first. In FIG. 1, the mechanical switch 2 is in the open state, which is equivalent to the internal structure of the conventional portable terminal. When the outer case 5 is tapped in this state, the vibration of the case causes the mechanical vibration system within the electromagnetic induction actuator 1 to vibrate. As described above, the mechanical vibration system is flexibly supported by two leaf-spring suspensions, and so a graph of the oscillation characteristics of the mechanical vibration system shows gradual convergence and attenuation over time. The broken line curve in FIG. 2 shows the oscillation characteristics measured through the outer case 5. Vibrating as shown by the broken line curve, the mechanical vibration system causes the air to quiver, producing an extraneous tone similar to a snapped string.

Figure 3:
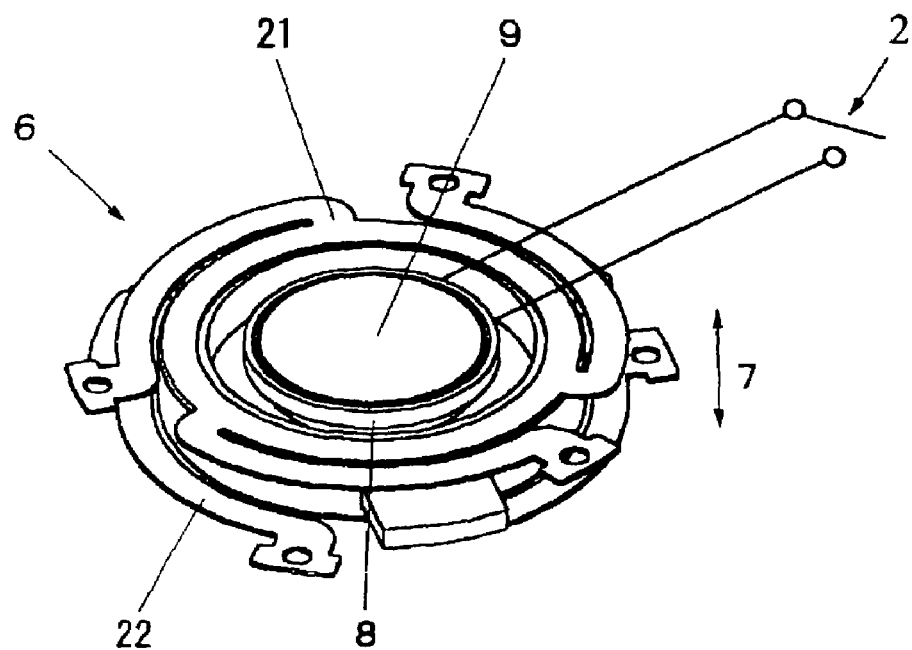
FIG. 3 is an oblique sketch of the mechanical vibration system and voice coil of the electromagnetic induction actuator when the mechanical switch is open.
Figure 4:
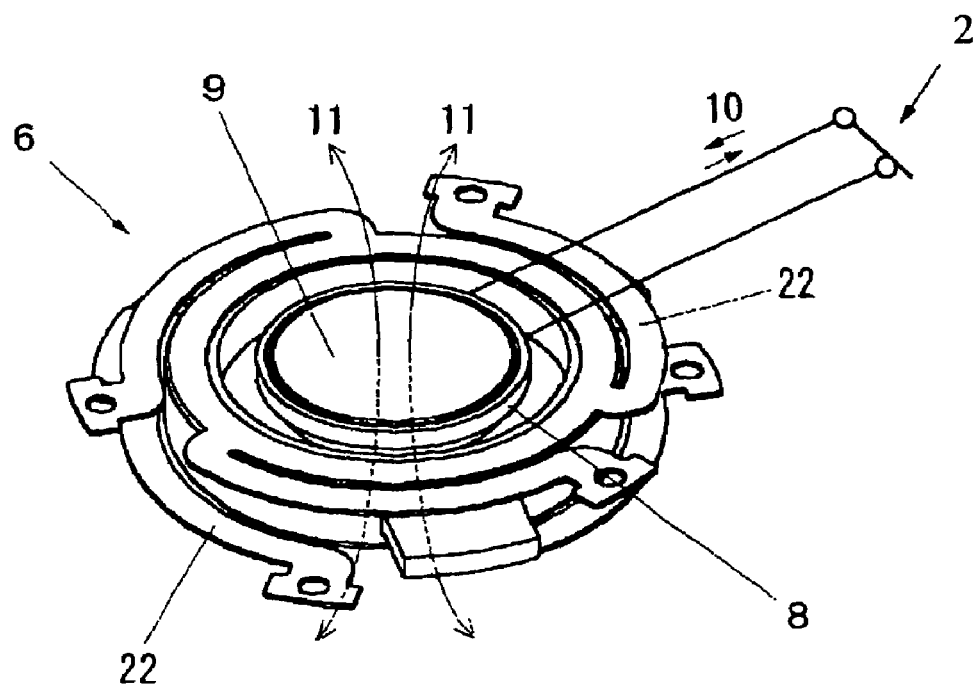
FIG. 4 is an oblique sketch of the mechanical vibration system and voice coil of the electromagnetic induction actuator when the mechanical switch is closed.

Next, while explaining the principle of reduction of the extraneous tone, the structure and operation of a concrete device will be explained. FIGS. 3 and 4 are oblique sketches that show the states of the mechanical vibration system and voice coil of the electromagnetic induction actuator. When the outer case is tapped as described above, the mechanical vibration system 6 vibrates up and down in the direction of arrow 7. With that, electromagnetic induction occurs between the magnetic circuit 9 of the mechanical vibration system 6 and the voice coil 8 that is electrically connected to the terminal fittings, and induced electromotive force is created in the voice coil 8. Because the mechanical vibration system 6 vibrates up and down, the direction of the induced electromotive force keeps changing back and forth with each cycle.

When the mechanical switch 2 is open, as in FIG. 3, the terminal fittings (not illustrated) are opened and so the induced electromotive force generated in the voice coil 8 does not flow as an induced current. Consequently no magnetic field is produced by the induced current. When the mechanical switch 2 is closed as in FIG. 4, however, there is a closed circuit between the voice coil 8 and the mechanical switch 2, and so the induced current 10 flows through the voice coil 8 and generates a magnetic field 11. The direction of this magnetic field 11 counters the direction of vibration of the magnetic circuit, and so the up and down oscillations of the mechanical vibration system are suppressed and converge quickly. The curve of the oscillation characteristics, as measured through the outer case, is shown by the solid line in FIG. 2. As FIG. 2 indicates, the oscillation characteristics when the mechanical switch 2 is closed (the terminal fittings are short-circuited) converge at zero more quickly than the oscillation characteristics when it is open, and so the sense of reverberation in the audible period is greatly diminished. In this way, the user's awareness is that the extraneous tone is reduced.

Figure 5:
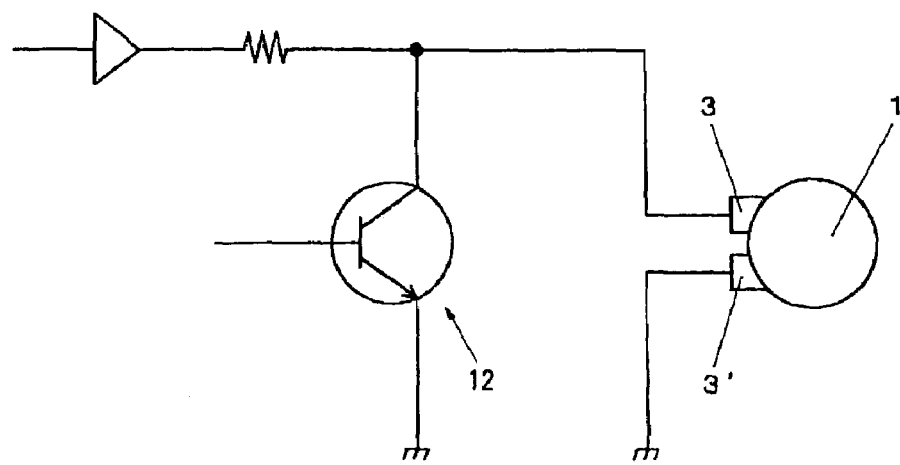
FIG. 5 is a circuit diagram showing the internal construction of a portable terminal in which is mounted an extraneous tone reduction device in which a transistor is used in the mechanical switch of FIG. 1.

Now, the mechanical switch 2 can be made using a transistor as shown in FIG. 5, an FET or other semiconductor element with a switching action, or a relay or other excited contact device. It is also possible to form an analog switch of various semiconductor devices and use that as the mechanical switch. It is also possible, needless to say, to obtain the same effect using an IC that incorporates an analog switch.

Using this example of implementation, it is possible to reduce the extraneous tone when the portable terminal is awaiting an incoming call, and by limiting the additional parts required to realize the extraneous tone reduction device to the one mechanical switch, it is possible to minimize any increase to the size or cost of the portable terminal. By using a mechanical switch that is widely known and structure is simple, it is possible to provide a portable terminal in which is mounted an extraneous tone reduction device with a switching function that is inexpensive and highly reliable.

Second Example of Implementation: The second example of implementation of the portable terminal of this invention is explained in detail below, with reference to the circuit diagram of FIG. 6. Now, the internal structure, operation and functions of the electromagnetic induction actuator 1 are the same as shown in FIG. 8; duplicative explanation is omitted. The explanation of this example of implementation is based on the assumption that the electromagnetic induction actuator 1 is not in the operating state; that is, that the portable terminal 4 is in the state of awaiting an incoming call. The extraneous tone reduction device of FIG. 6 comprises the electromagnetic induction actuator 1, and two amplifiers 13, 13' that are electrically connected to the terminal fitting 3 (and 3') respectively.

Amplifiers have been mounted in conventional portable terminals as well, but when those terminals are in the state of awaiting an incoming call, the voltage to the amplifiers is turned down, and their function is essentially stopped. This example of implementation is set so that voltage is always applied to the amplifiers 13, 13' and they are in an operating state.

The operation of a portable terminal constituted in this way is explained below. In a quiet state with no outside force applied to the outer case 5, there is no signal input to the amplifiers 13, 13', and so the voltage value of the output signals 15, 15' is maintained at 0[V]. The voltage value of the signal found at the terminal fitting 3 (and 3') of the electromagnetic induction actuator 1 is also maintained at 0[V]. When vibration is applied by a tap on the outer case 5, the vibration is passed to the extraneous noise reduction device inside the outer case 5, and the mechanical vibration system (not illustrated) within the electromagnetic induction actuator 1 vibrates.

Because of this vibration, there is electromagnetic induction between the magnetic circuit of the mechanical vibration system and the voice coil, and an induced electromagnetic force is generated in the voice coil. When this induced electromagnetic force is found on the terminal fittings 3, 3', the voltage value of one side or the other of signal 14, 14' changes from 0[V] to a value of V[V], for a voltage imbalance between the two input terminals. In this way the voltage value of the signal 14 changes from 0[V] to V [V].

Then the signal 14 is input as feedback to the amplifier 13'; the voltage value of the output signal 15' changes to −V[V] and is input to the terminal fitting 3'. In that way, a closed circuit is formed between the voice coil (not illustrated) and the two amplifier circuits 13, 13', the induction current flows in the voice coil and a magnetic field is created. After that, the direction of this magnetic field 11 suppresses the oscillations of the mechanical vibration system and cause convergence at zero, thus reducing the extraneous tone by the same principle as in the first example of implementation.

Figure 6:
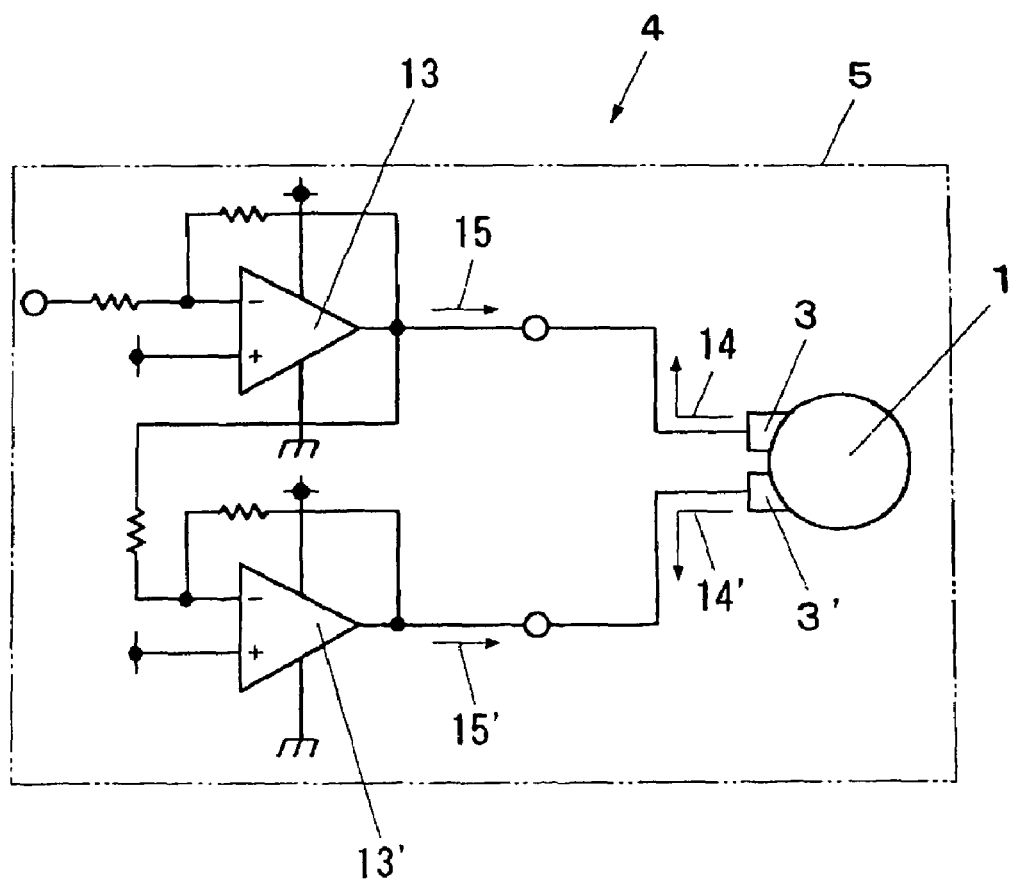
FIG. 6 is a schematic circuit diagram showing the internal construction of portable terminal of the second example of implementation of this invention.

In addition to that reduction of the extraneous tone, the operation of the amplifiers 13, 13' in itself has the effect of reducing the extraneous tone. That operation is explained below. In FIG. 6 no signal is input to the amplifier 13 (that is, the input side of the amplifier circuit 13 is normally 0[V]), and so the output signal 15 gradually changes from V [V] to 0[V]. Because of this output signal 15 is applied to the terminal fitting 15, signal 14 also changes to 0[V]. Then as signal 14 is fed back and input to the amplifier, the output. And signal 14' also changes to 0[V]. That is, the two amplifier circuits 13, 13' adjust their output signals 15, 15' to 0[V], which restores the original quiet state of the electromagnetic induction actuator, with the voltage values of the signals 14, 14' returned to 0[V]. It can be seen from the above that connecting amplifiers, which are normally set in the operating state by application of a voltage, to the electromagnetic induction actuator is effective in reduction of the extraneous tone.

The oscillation characteristics of the mechanical vibration system measured through the outer case 5 measure almost the same as the curve shown by the solid line in FIG. 2. Accordingly, the sense of reverberation in the audible period is greatly diminished and in this way, the user's awareness is that the extraneous tone is reduced.

Using this example of implementation, it is not necessary to add new equipment to the portable terminal, since amplifiers conventionally mounted in the portable terminal are used for reduction of the extraneous tone. There is, therefore, no need to increase the size or cost of the portable terminal. Because well known and structurally simple amplifiers are used, it is possible to provide an extraneous tone reduction device of low cost and high operating reliability, and a portable terminal in which such a device is mounted.

Figure 7:
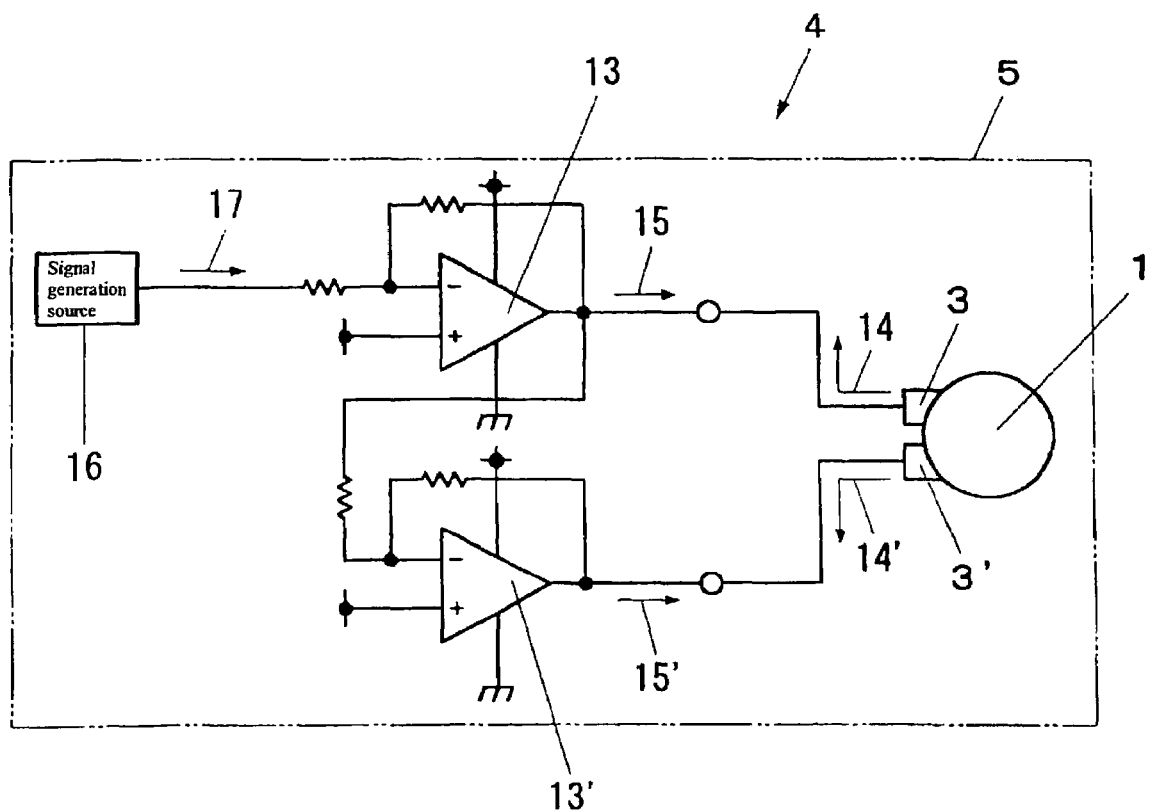
FIG. 7 is a schematic circuit diagram showing the internal construction of portable terminal of the third example of implementation of this invention.

Third Example of Implementation: The third example of implementation of the portable terminal of this invention is explained in detail next, with reference to the circuit diagram of FIG. 7. Now, parts and structure that duplicate or overlap those of the second case of implementation above are omitted. In this example of implementation the extraneous tone reduction device has, in addition to the circuit constitution shown in FIG. 6, a signal generator source 16 that is electrically connected to one amplifier 13 to output a signal to it; the device is mounted inside the outer case 5 of the portable terminal 4. In this example of implementation too, the amplifiers 13, 13' are always set in an operating state with voltage applied, and the explanation assumes a state in which the electromagnetic induction actuator 1 is not operating; that is, that the portable terminal 4 is in the state of awaiting a call.

The following explanation concerns the overall operation of the portable terminal when the signal generation source 16 generates a constant-voltage signal 17, and the portable terminal 4 in which this device is mounted. The constant-voltage signal 17 is amplified by the amplifiers 13, 13' and input to the terminal fittings 3, 3' of the electromagnetic induction actuator 1. The voltage value of the output signals 15, 15' at that time is expressed as V[V] for convenience of explanation.

In a quiet state with no outside force applied to the outer case, the voltage values of the signals 15, 15' are maintained at V[V] and −V[V]. Consequently, the voltage values of the signals 14, 14' found on the terminal fittings 3, 3' of the electromagnetic induction actuator 1 are also maintained at V[V] and −V[V]. Tapping the outer case 5 in this state causes vibration that generates electromagnetic induction between the magnetic circuit of the mechanical vibration system (not illustrated) and the voice coil (not illustrated), so that an induced electromotive force arises in the voice coil.

This electromotive force is found on the two terminal fittings 3, 3' that are electrically connected to the voice coil, and so the voltage value of one of the signals 14, 14' found on the terminal fittings 3, 3' changes from V[V] to V'[V], and the voltage values of the signals 14, 14' are unbalanced between the two input terminals.

Then, as previously stated in the second example of implementation, a closed circuit is formed between the voice coil (not illustrated) and the two amplifiers 13, 13', an induced current flows through the voice coil, and a magnetic field is created, so that the vibration of the mechanical vibration system is suppressed and converges on zero, and the extraneous tone is reduced.

Further, in addition to this extraneous tone reduction operation, this example of implementation makes it possible to achieve an extraneous tone reduction effect from the operation of the amplifiers 13, 13'. This operation is explained below. According to FIG. 7, the input side of amplifier 13 is always maintained at a fixed voltage value from the constant-voltage signal 17, and so the output signal 15 gradually changes from V'[V] to V[V]. Because of this output signal 15, the signal 14 also changes to V[V]. Then, by inputting the signal 14 to the amplifier circuit 13' as feedback, the output signal 15' is changed to −V[V], and when the signal 15' is applied, the signal 14' also changes to −V[V]. In other words, the two amplifiers 13, 13' adjust their output signals 15, 15' to V[V] and −V[V], and by that means the electromagnetic induction actuator 1 is returned to its original quiet characteristics, with the signals 14, 14' having voltage values of V[V] and −V[V]. It can be seen from the above that connecting amplifiers, which are normally set in the operating state by application of a voltage, to the electromagnetic induction actuator and inputting a constant-voltage signal to the amplifiers is effective in reduction of the extraneous tone.

The oscillation characteristics of the mechanical vibration system measured through the outer case 5 measure almost the same as the curve shown by the solid line in FIG. 2. Accordingly, the sense of reverberation in the audible period is greatly diminished and in this way, the user's awareness is that the extraneous tone is reduced.

One standard for the voltage value of the constant-voltage signal 17 is to have a voltage value such that, when the signal 17 is amplified and input to operate the electromagnetic induction actuator 1, it drives the electromagnetic induction actuator 1 without the user of the portable terminal being aware of that operation. That is, the voltage value should be smaller than the voltage value that performs the incoming call notification operation of the electromagnetic induction actuator 1 (hereafter the operating voltage). However, the value of the operating voltage can vary, depending on the type, size, weight and model of the electromagnetic induction actuator 1. Consequently, it is not possible to make a blanket statement that the voltage value of the constant-voltage signal should be less than any specific voltage. As stated above, it is preferable to set that value with reference to the operating voltage of the electromagnetic induction actuator 1.

Now, for the convenience of explanation, the third example of implementation has been explained only in the case of an inversion amplifier circuit using operational amplifiers. It is possible, however, to change the amplifier as long as it has the function of holding the output signal constant. The same effect can be had, needless to say, by replacing the amplifiers with amplifiers created by connecting transistors, FETs or other semiconductor elements.

In this example of implementation a constant-voltage signal is amplified and applied to the terminal fittings, but the same effect can be had by amplifying the voltage of a constant-frequency signal, which has a fixed frequency, and applying that to the terminal fittings instead of a constant-voltage signal. Now, the constant-frequency signal is produced by the signal generator 16.

One standard for the frequency range of the constant-frequency signal is to set the range that will allow operation at a level that will not be noticed by the user of the portable terminal 4 when the electromagnetic induction actuator 1 operates. The frequency should be set, therefore, outside the operating range of the electromagnetic induction actuator 1. However, that operating range will vary depending on the type, size, weight and model of the electromagnetic induction actuator 1; a blanket decision is not possible, and no one specific frequency can be specified as the appropriate frequency rang for the constant-frequency signal. As a guideline, it is preferable to set the range outside the 20[Hz] to 20[kHz] range generally know as the frequency range audible to humans, but because the audible range varies from person to person, a blanket decision is not possible. As stated above, it is preferable to decide the range with reference to the operating range of the electromagnetic induction actuator 1; mounted in the portable terminal 4.

Using this example of implementation, amplifiers conventionally mounted in the portable terminal are used for reduction of the extraneous tone by means of constant operation. Adding no new parts to the portable terminal except a vibration generator, it is possible to reduce the extraneous tone while minimizing increases to the size or cost of the portable terminal.

POTENTIAL FOR INDUSTRIAL USE

Using this invention, it is possible to reduce the extraneous tone when a portable terminal is in the state of awaiting an incoming call, and it is also possible to realize an extraneous tone reduction device in which only one new part—a mechanical switch or a source of vibration—is mounted in the portable terminal, or to realize an extraneous tone reduction device that uses amplifiers already mounted in the portable terminal without mounting any new parts. It is possible, accordingly, to hold to a minimum any increase in the size or cost of the portable terminal, and to provide an inexpensive and highly reliable extraneous tone reduction device and a portable terminal in which such a device is mounted.

The invention claimed is:

1. A portable communication terminal for receiving an incoming communication, the terminal having a compact electromagnetic induction actuator for producing a vibration as well as an audible signal, comprising:

a magnetic vibration system having a plate magnet, a yoke and a pole piece;

a cylindrical housing enclosing an upper and a lower leaf-spring suspension which sandwich vibration system;

an audible generator disposed on one end of the cylindrical housing, the audible generator having a voice coil, a diaphragm attached to the voice coil;

a pair of input terminal disposed on the housing and connected to the voice coil and the magnetic vibration system for conveying an electrical signal having a frequency that produce a vibration in the magnetic vibration system or the audible sound generator, depending on the frequency of the electrical signal; and an individual amplifier connected to the each input terminal and the amplifier is normally set in operating state by application of a voltage, and a signal from the input terminal is fed to one of the amplifier for adjusting the output signal of the amplifier when the portable communication terminal is awaiting an incoming call.

2. A portable communication terminal, as described in claim 1, further comprising: a signal generation source electrically connected to the amplifier for providing a constant-voltage signal and a constant-frequency signal to the amplifier.

3. A portable communication terminal for receiving an incoming communication, the terminal having an electromagnetic induction actuator for producing a vibration as well as an audible signal, comprising:

a magnetic vibration system having a plate magnet, a yoke and a pole piece;

a cylindrical housing enclosing an upper and a lower leaf-spring suspension which sandwich the magnetic vibration system;

an audible sound generator disposed on one end of the cylindrical housing, the sound generator having a voice coil and a diaphragm attached to the voice coil;

a pair of input terminal disposed on the housing and connected to the voice coil and the magnetic vibration system for conveying an electrical signal having a frequency that produces a vibration in the magnetic vibration system or an audible sound in the round generator, depending on the frequency of the electrical signal; and means for short-circuiting the pair of input terminal so as to short circuit the voice coil and to dampen the movement of the magnetic vibration system, when an incoming communication is not being received, so as to reduce a production of an extraneous tone in the voice coil.

4. A portable communication terminal, as recited in claim 3, wherein the means for short-circuiting is an electronic switch.

5. A portable communication terminal, as recited in claim 3, wherein the means for short-circuiting is an electro-mechanical switch.

* * * * *